Sept. 23, 1924.
C. A. DISBROW
1,509,668
INSULATING UNIT FOR RAIL JOINTS
Filed March 11, 1924  2 Sheets-Sheet 1
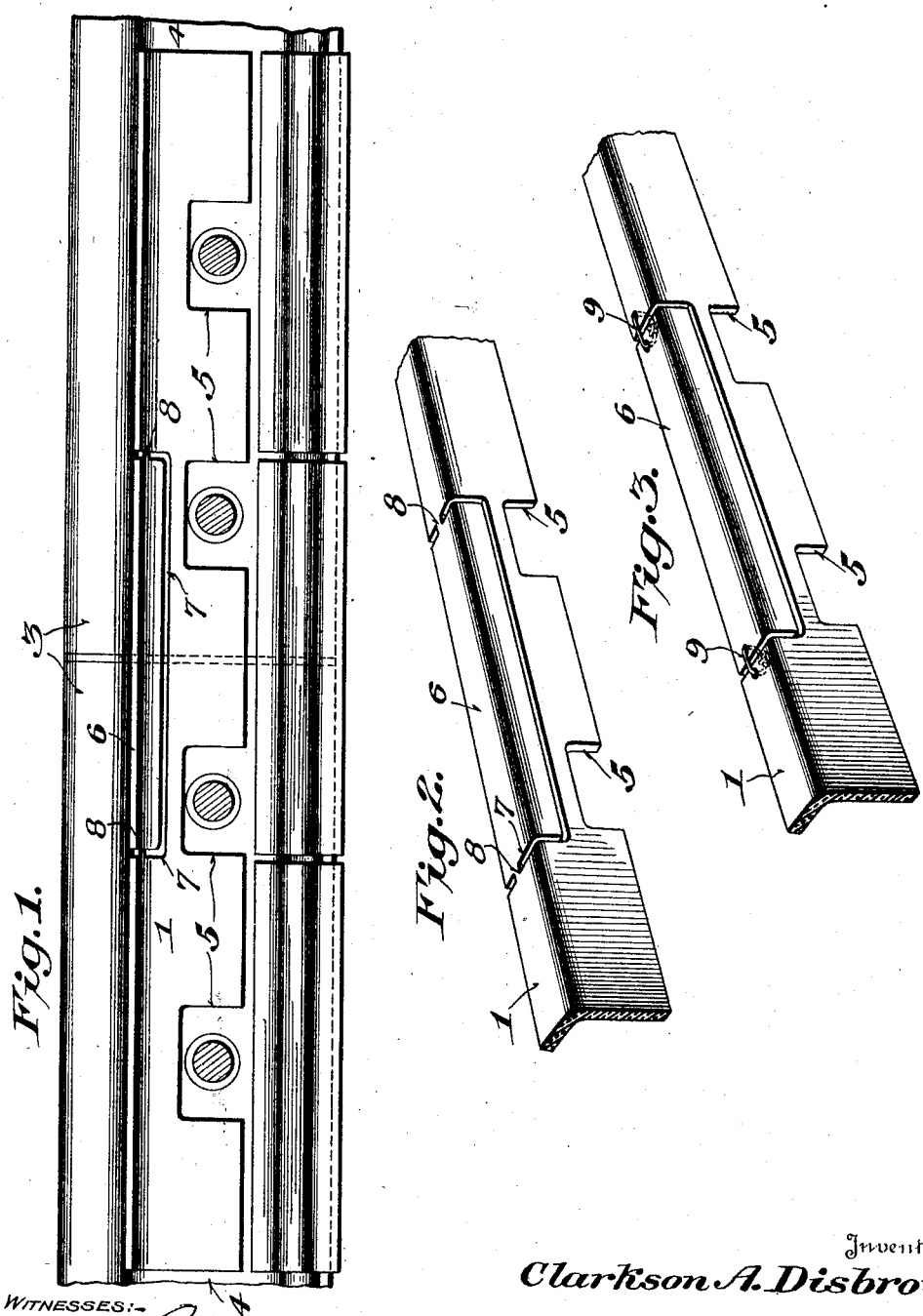
Inventor
Clarkson A. Disbrow,
By
Attorney Sept. 23, 1924. 1,509,668
C. A. DISBROW
INSULATING UNIT FOR RAIL JOINTS
Filed March 11, 1924 2 Sheets-Sheet 2
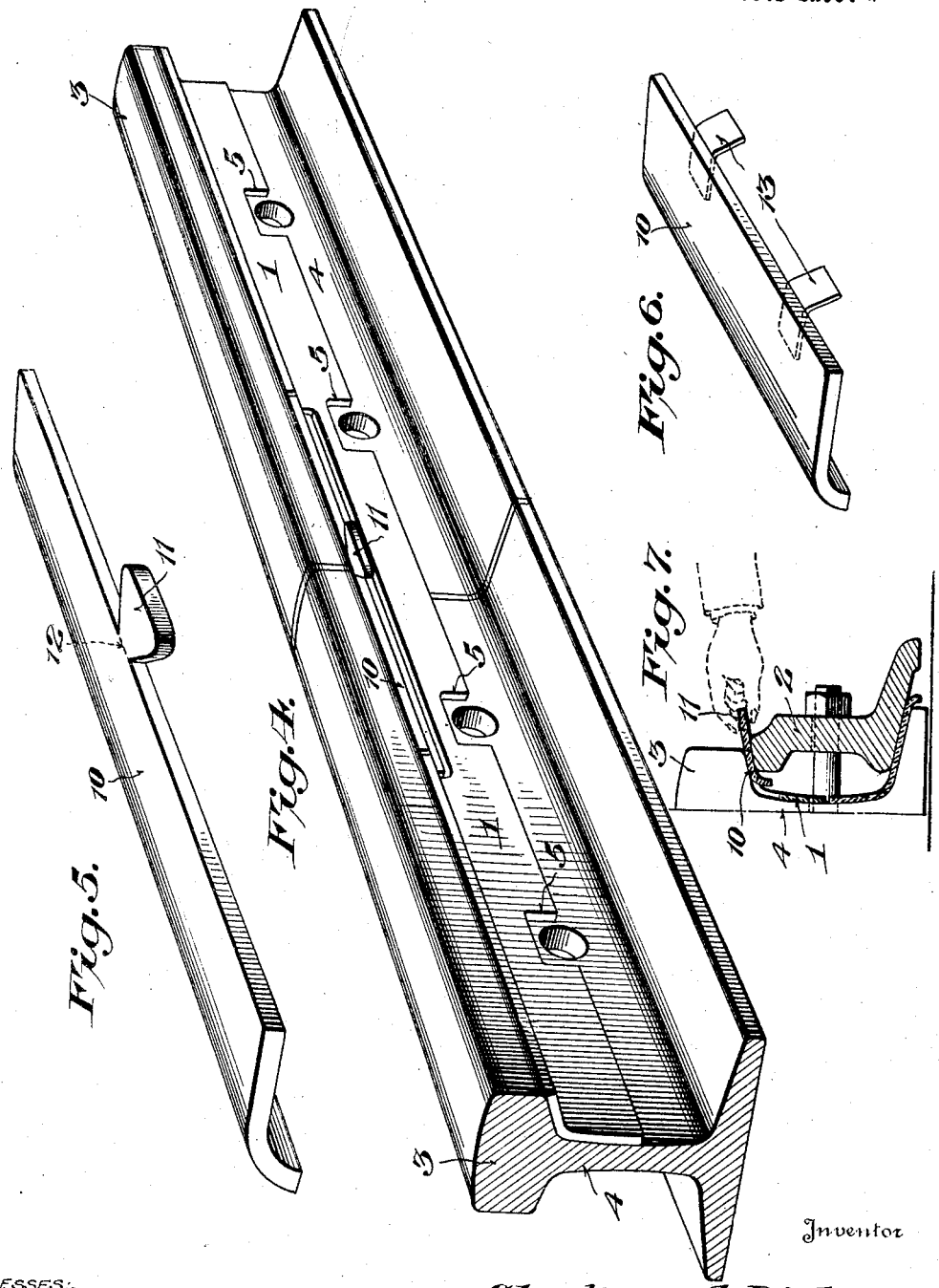

Patented Sept. 23, 1924.

1,509,668

UNITED STATES PATENT OFFICE.

CLARKSON A. DISBROW, OF NEW ROCHELLE, NEW YORK, ASSIGNOR TO THE RAIL JOINT COMPANY, OF NEW YORK, N. Y., A CORPORATION OF NEW YORK.

INSULATING UNIT FOR RAIL JOINTS.

Application filed March 11, 1924. Serial No. 698,495.

*To all whom it may concern:*

Be it known that I, CLARKSON A. DISBROW, citizen of the United States, residing at New Rochelle, in the county of Westchester and State of New York, have invented certain new and useful Improvements in Insulating Units for Rail Joints, of which the following is a specification.

This invention relates to an improvement in insulating units for rail joints and more particularly to an improved feature of construction which facilitates the removal or replacement of the worn or damaged part of the insulation.

According to the invention of my former patent, No. 1,311,440, granted July 29, 1919, provision is made whereby that part of the insulation which is subject to the most rapid wear or disintegrating influences is readily removable or replaceable without disturbing or affecting the remaining portions of good or worn insulation and it has been found desirable to provide simple and economical means for temporarily holding the wear insert or section in position relative to the body portion of the insulation whereby the entire insulating unit may be expeditiously positioned as a whole, and the joint bar assembled and tightened without danger of the insert or wear section becoming displaced. Also the invention contemplates novel means whereby the wear insert or section may readily be removed and replaced without dismantling the joint.

Another important object of my invention lies in the provision of a replacement wear insert having means for supporting the same in its proper position during the time the joint bars are being assembled and tightened.

With the above and other objects in view which will more readily appear as the nature of the invention is better understood, the same consists in the novel construction, combination and arrangement of parts hereinafter more fully described, illustrated and claimed.

Certain preferred and practical embodiments of my invention are shown in the accompanying drawings, in which:—

Figure 1 is a side elevation of a rail joint, with the joint bar removed to expose my improved insulating unit.

Figure 2 is a perspective view of the insulating unit.

Figure 3 is a similar view but showing another form of temporary fastening means for the wear section.

Figure 4 is a perspective view of the rail joint showing the application of the replacement wear section, the joint bars being removed.

Figure 5 is a perspective view of the wear section shown in Figure 4.

Figure 6 is a perspective view of a modified form of replacement wear section, and Figure 7 is a detail sectional view showing the application of a replacement wear section.

Like reference numerals designate corresponding parts throughout the several figures of the drawings.

The present invention is applicable to any type of fiber, or equivalent insulation, for rail joints, and includes a head section or unit 1 of insulation which is in the form of a strip adapted for insertion between the head of the joint bar 2, and the underside of the heads 3—3 of the alined rail sections 4—4. This insulating unit 1 is preferably formed with notches 5 for interlocking engagement with the joint bolts to prevent longitudinal displacement of the insulation.

Inasmuch as that portion of the insulating unit, directly under the head of the receiving rail, is subjected to the greatest shock and resultant damage, it is desirable to avoid discarding the entire insulating unit by providing that particular portion of the unit with a replaceable wear insert or section 6. Practice has demonstrated that difficulty may be experienced in assembling insulated rail joints in which the wear section is formed separately and is not supported by the main body portion of the insulating unit, for the reason that the separate wear section is liable to become displaced. Therefore, it is desirable to temporarily secure the wear section 6 to the main body portion of the unit 1 whereby the wear section will be supported in its proper position while the joint is being assembled and tightened. To this end, as shown in Figure 2, I have partially separated the wear section 6 from the main body 1 by means of an interrupted slot 7, the interruptions forming necks 8—8 which constitute rupturable temporary fastening means. The necks 8 are preferably narrow so that when it is desired to remove the wear section 6 the necks may be readily ruptured by any suitable tool.

As shown in Figure 3, the replaceable wear section 6 may temporarily be fastened on the main body portion of the unit 1 by means of ties 9—9 which preferably consist of strings or other non-conducting means. These temporary fastening means or strings 9 may be readily severed after the entire unit has been assembled in the joint. Any other equivalent rupturable fastening means may be utilized as a temporary fastening connection between the replaceable wear insertion section and the main body of the insulation, the invention only requiring some practicable fastening means which will hold the parts together as a unit while being installed in a joint, will not impair the electrical insulating property of the unit, and which is readily rupturable or breakable to permit the worn insert to be readily removed and replaced by a new or replacement insert.

My invention also includes the use of a replacement wear insert 10 which in form is adapted to fit the space previously occupied by the replaceable wear insert or section 6. In connection with the replacement or new wear insert 10 it is desirable to provide the same with means for temporarily holding it in proper position until the joint bolts are tightened up to cause the head of the joint bar to clampingly engage all parts of the insulation, otherwise the replacement insert might accidentally fall behind the joint bar before it is tightened up. For that purpose the new or replacement insert is preferably provided with holding means of some kind. As shown in Figures 4 and 5 of the drawings, such holding means may consist of a tab or finger piece 11 formed along the outer upper edge of the replacement or new insert and said tab or finger piece may be of a triangular or equivalent form having a narrow neck portion 12 which permits the tab or finger piece to be readily broken off after the joint has been tightened up with the new insert in place.

Another form of holding means is the new or replacement insert which is shown in Figure 6 of the drawings, and these holding means consist of pliable or flexible tabs 13 fitted to the outer edge of the new or replacement insert and adapted to be bent over the outer edge of the head of the joint bar thereby to constitute in effect hooks for temporarily supporting or holding the new insert in its proper position while the joint is being retightened. It will, of course, be understood that the new or replacement insert takes the place of the replaceable wear insert 6 which is removed because of having become worn or damaged.

From the foregoing, it is thought that the construction, function and utility of the herein described improvement will now be readily apparent and it will be understood that changes in the form, proportion and minor details of construction may be resorted to without departing from the spirit of the invention and scope of the appended claims.

What I claim is:

1. An insulating unit for rail joints having a removable wear section temporarily secured to the main body portion of the unit.

2. An insulating unit for rail joints having a centrally disposed removable wear section temporarily secured to the main body portion of the unit.

3. An insulating unit for rail joints having a removable wear section temporarily secured by a rupturable fastening means to the main body portion of the unit.

4. An insulating unit for rail joints having a centrally disposed removable wear section temporarily secured by a rupturable fastening means.

5. An insulating unit for rail joints having a removable wear section temporarily secured by rupturable integral necks to the main body portions of the unit.

6. An insulating unit for rail joints having a centrally disposed removable wear section temporarily secured by rupturable integral necks.

7. An insulating unit for rail joints comprising a plurality of alined sections including a removable intermediate wear section temporarily secured to the adjacent sections.

8. An insulating unit for rail joints comprising a plurality of alined sections including a removable intermediate wear section temporarily secured by rupturable fastening means to the adjacent sections.

9. An insulating unit for rail joints comprising a plurality of alined sections including a removable intermediate wear section, temporarily secured by rupturable integral necks to the adjacent sections.

10. An insulating unit for rail joints, including a replacement wear insert having holding means for temporarily positioning the same.

11. An insulating unit for rail joints, including a replacement wear insert having a supporting tab constituting temporary holding means therefor.

12. An insulating unit for rail joints, including a replacement wear insert having a rupturable finger tab.

In testimony whereof I hereunto affix my signature in the presence of two witnesses.

CLARKSON A. DISBROW.

Witnesses:
E. K. KERSHNER,
KATHERINE McNALLY.